(12) United States Patent
Salz (10) Patent No.: US 6,502,898 B1
(45) Date of Patent: Jan. 7, 2003

(54) LAMELLA ROOF FOR A VEHICLE ROOF OPENING

(75) Inventor: Wolfram Salz, Vaihingen/Enz (DE)

(73) Assignee: CTS Fahrzeug Dachsysteme GmbH, Korntal-Muenchingen (DE)

( * ) Notice: Subject to any disclaimer, the term of this patent is extended or adjusted under 35 U.S.C. 154(b) by 0 days.

(21) Appl. No.: 09/597,712

(22) Filed: Jun. 19, 2000

(30) Foreign Application Priority Data

Jun. 17, 1999 (DE) .......................................... 199 27 654

(51) Int. Cl.[7] .................................................. B60J 7/047
(52) U.S. Cl. ................................................. 296/220.01
(58) Field of Search .................................. 296/220.01

(56) References Cited

U.S. PATENT DOCUMENTS

| | | | |
|---|---|---|---|
| 4,357,047 A | 11/1982 | Katz | |
| 4,904,017 A | 2/1990 | Ehrlich | |
| 4,940,279 A | 7/1990 | Abott et al. | |
| 5,509,714 A | 4/1996 | Schmidt | |
| 5,664,826 A | 9/1997 | Wilkens | |
| 5,836,642 A | * 11/1998 | Salz | ................. 296/220.01 X |
| 5,860,693 A | 1/1999 | Ehrlich | |
| 5,897,160 A | * 4/1999 | Reihl et al. | ............ 296/220.01 |
| 5,938,274 A | 8/1999 | Ehrlich | |
| 5,992,117 A | 11/1999 | Schmidt | |

FOREIGN PATENT DOCUMENTS

| | | | |
|---|---|---|---|
| DE | 4127624 | | 9/1992 |
| DE | 4415649 | * | 6/1995 |
| DE | 19529702 | | 9/1996 |
| DE | 19542884 | * | 12/1996 |
| DE | 19608916 | * | 4/1997 |
| DE | 197 20 822 C1 | | 5/1997 |
| DE | 19529702 | * | 9/1998 |
| DE | 19542884 | | 11/1998 |
| GB | 2258848 | * | 2/1993 |
| WO | 9911479 | | 3/1999 |

OTHER PUBLICATIONS

European Search Report, dated Mar. 2001.*

* cited by examiner

Primary Examiner—Dennis H. Pedder
(74) Attorney, Agent, or Firm—Crowell & Moring LLP

(57) ABSTRACT

A control mechanism for a lamella roof has two successive lamellae which are supported on a guide carriage via their mutually facing sides. The articulation of one lamella on the guide carriage takes place via a control rocker which is positively controlled in dependence on the position of the other lamella.

14 Claims, 7 Drawing Sheets

LAMELLA ROOF FOR A VEHICLE ROOF OPENING

BACKGROUND OF THE INVENTION

This application claims the priority of 199 27 654.4, filed Jun. 17, 1999, the disclosure of which is expressly incorporated by reference herein.

The present invention relates to a lamella roof for a roof opening of a motor vehicle having at least two lamellae which can be fixed to the roof and, guided on rails, can be moved, via a guide mechanism, between a closed position, in which they are arranged in a composite sheet-like arrangement covering the roof opening, and an open position.

Lamella roofs are known, for example, as seen in DE 197 20 822 C1 and comprise a plurality of lamellae which extend transversely to the direction of travel and, with the roof closed, form a sheet-like, closed composite lamella arrangement. If the lamella roof is opened, then the lamellae are moved together at the rear end of the roof opening, as seen in the direction of travel; to be more precise they are positioned obliquely upward in the rearward direction such that they partially overlap one another in a layered manner. In the region of their mutually adjacent edges, running transversely to the direction of travel, successive lamellae in each case are connected to a common guide carriage.

Of these lamellae, the rear lamella, as seen in the closing direction of the roof and thus usually also the direction of travel of the vehicle, can be pivoted, in its front border region, about a pin which is fixed in relation to the guide carriage. The front lamella, as seen in the closing direction, is guided, in its rear border region, via a control rocker which can be extended and, in the extended position, raises the rear lamella end. The lamella is pivoted about the associated fixed pin which is assigned to the upstream guide carriage, as seen in the closing direction. If the lamella is displaced in the opening direction via the extended control rocker, then it overlaps the correspondingly positioned downstream lamella.

With the roof closed, in the known solution, the respective lamella carrier is supported against the control rocker, which guides the carrier at its rear end, as seen in the closing direction. The control rocker is assigned, as a securing means and additional blocking element, a safety catch which, in a hammer-shaped configuration, in the region of its handle, is mounted on the control rocker and, in the region of its head, on the one hand is supported on the bearing bracket of the guide carriage. The bracket receives the pivot pin for the control rocker, and, on the other hand, with the lamella closed, overlaps the latter in the stop region against the control rocker.

The longitudinal displacement of the lamella assembly in the opening direction with the opening out of the rear lamella, as seen in the closing direction, via a separate opening-out guide results in an opening-out operation of the lamellae which run onto the rear lamella if the control rocker, which is pressure-loaded and/or spring-loaded in the opening-out direction, loses in each case its guide bearing in relation to a guide rail by latching into a rail-side receiving unit and the hammer-shaped safety catch releases the displacement. This results from the fact that the safety catch, during pivoting of the control rocker, changes its position in relation to the bearing bracket as guide surface and in relation to that end of the lamella carrier which supports the control rocker. With the control rocker running into its functional end position, the safety catch releases the longitudinal displacement in the direction of the already opened-out, upstream lamella, as seen in the opening direction.

As a result of the space conditions given in the case of lamella roofs for motor vehicles, the hammer-shaped safety catch is of a comparatively intricate design which, as far as the sought-after functions are concerned, also has to have high processing accuracy in relation to the associated guide surfaces. It is necessary, in addition, for relatively high forces to be controlled reliably. In addition, the multiplicity of functional parts entail high production requirements and the risk of greater tolerances. This is aggravated by the fact that the sought-after, gradual opening out of the lamellae is achieved, via the assignment to certain rail positions, that is to say to parts which are independent in relation to the respective guide carriage, and is also controlled independently for each lamella. In addition, the tie to certain rail positions limits the possible variations of a lamella roof.

SUMMARY OF THE INVENTION

An object of the present invention is to provide a control for a lamella-roof structure which is easier to produce, does not restrict the possible variations of a lamella roof and, while being of space-saving construction, provides a favorable distribution of the respective functions in relation to opening and closing of the lamella roof. Nevertheless, the lamella roof is to be locked securely in the respectively adjusted positions.

This has been achieved according to the invention by positive coupling between the control rocker and the rear lamella carrier, as seen in the closing direction.

This positive coupling is provided in the opening direction of the lamella carrier, guided by the control rocker, but preferably in the opening and closing directions and over the entire pivoting path in each case. For this purpose, the pivot pin assigned to a guide carriage is preferably positioned such that these pivot pins for the control rocker of the front lamella, as seen in the closing direction, and for the lamella carrier of the rear lamella, as seen in the closing direction, are located in each case adjacent to the other lamella. As a result, the pivot pin assigned to the control rocker and provided on the guide carriage is offset in the opening direction of the roof in relation to the fixed pivot pin assigned to the same control carriage, and belonging to the downstream lamella carrier, as seen in the closing direction, which follows in the opening direction.

Starting from the pivot pins, with opposite directions of extent, there is overlapping between the control rocker, on one hand, and the lamella carrier, on the other hand, in the region between the pins thereof which are provided on the same guide carriage. This makes it possible, in a particularly straightforward manner, for the pivoting movements of the rear lamella carrier, as seen in the closing direction, which can be pivoted about its fixed pin, to be converted synchronously, during opening of the roof, into corresponding pivoting movements of the control rocker.

All that is necessary is for the control rocker, in the region between the pivot pins, to be supported in the vertical direction against the overlapping lamella carrier. The corresponding support may be configured straightforwardly in design terms, for example by a supporting bolt running in a slotted guide. It is possible for respectively desired transmission ratios to be determined straightforwardly in design terms via the inclination of the supporting surfaces running transversely to the pivot pin of the control rocker and/or via the distance between the respective pivot pins.

In such a basic configuration, it is also expediently contemplated for the support, with high compressive strength in the opening direction, of the lamella carrier, which is guided via the respective control rocker, to be realized in that the control rocker and the lamella carrier are assigned corresponding supporting surfaces. These are preferably located on both sides of the lamella-carrier crosspiece, which is preferably perpendicular to the respective lamella plane. It is expedient for the stop surfaces provided on both sides of the crosspiece to be arranged in a staggered manner in relation to the displacement direction in order, with the small width in the pivoting direction, to cover a large angle range in which the covering with high compressive strength can be achieved.

In a further expedient embodiment of the invention, the control rocker serves as a carrier for a blocking element formed by at least one blocking lever. The blocking lever preferably is mounted on the control rocker in that region of the latter which is remote from the pin of the control rocker, with this resulting in an extent which coincides with, but is in the opposite direction to, the control rocker. In its region adjacent to its pivot pin, the blocking lever is expediently supported against a guide path of the lamella carrier, which is guided by the control rocker. The guide path can be formed, preferably and by way of example, by that end side of the crosspiece of the lamella carrier which is remote from the lamella-side spine. Consequently, a straightforward assignment of the guide path to the guide slot, which extends along the lamella carrier, is achievable.

With corresponding control, the locking in relation to the next-following guide carriage in each case, or else in relation to the guide rail, can take place via the blocking lever.

The guide mechanism according to the invention provides, in addition to the positive coupling of the pivoting movement of the lamella carrier of the rear lamella, as seen in the closing direction, to the control rocker and/or to the lamella carrier of the upstream lamella, supported via the control rocker, by way of the control rocker, the ability of the lamella carrier to be supported with high compressive strength against the control rocker. In accordance with the coupling of the control rocker to the rear lamella carrier and with the displacement, with simultaneous pivoting of the same, by the compressive force introduced to the common lamella carrier via the control rocker, it is possible, with narrow tolerances, to coordinate the operation for reaching the end position of the rear lamella and terminating the pressure-exerting support.

In addition, however, it may be expedient for the blocking lever to be utilized as an additional supporting element by the blocking lever, in this phase, overlapping with part of the lamella carrier in the pressure-exerting direction. If the overlapping, which is preferably provided in relation to the end side of the lamella carrier, is only relinquished following the support of the lamella carrier against the control rocker, or at the same time as this, then the supporting surfaces which are provided there, and, on account of the space conditions, are comparatively small and thus subjected to high loading, are relieved of loading.

The relief from loading may additionally be controlled independently, according to the present invention, via the blocking lever. An advantageous solution in this respect consists in the blocking lever being assigned a supporting surface over which it is possible to pass and allows a dropping action of the blocking lever on the end side if the relief from loading is to be terminated. For this purpose, the supporting surface over which it is possible to pass is preferably provided on the downstream guide carriage, as seen in the closing direction, and formed by a bearing surface on which the blocking lever comes to bear during the displacement of the guide carriage on which the blocking-lever-bearing control rocker is mounted.

The bearing surface is configured such that the blocking lever drops and the support is terminated when the lamella carrier, which is borne via the associated control rocker, is to be released. The blocking lever may preferably be utilized at the same time in order to couple the running-on guide carriage to the following guide carriage.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

The following description of the drawings is based on a lamella roof of which the basic construction is generally known and which is intended for a roof opening of a motor vehicle. The illustration of the solution according to the invention is thus limited essentially to the illustration of the guide mechanism for the lamellae. The guide mechanism is provided at both lamella ends in the transition to the roof-side vehicle construction and, as far as the arrangement at the two lamella ends is concerned, is configured mirror-symmetrically to a plane extending in the displacement direction of the lamella roof.

Figure 1:
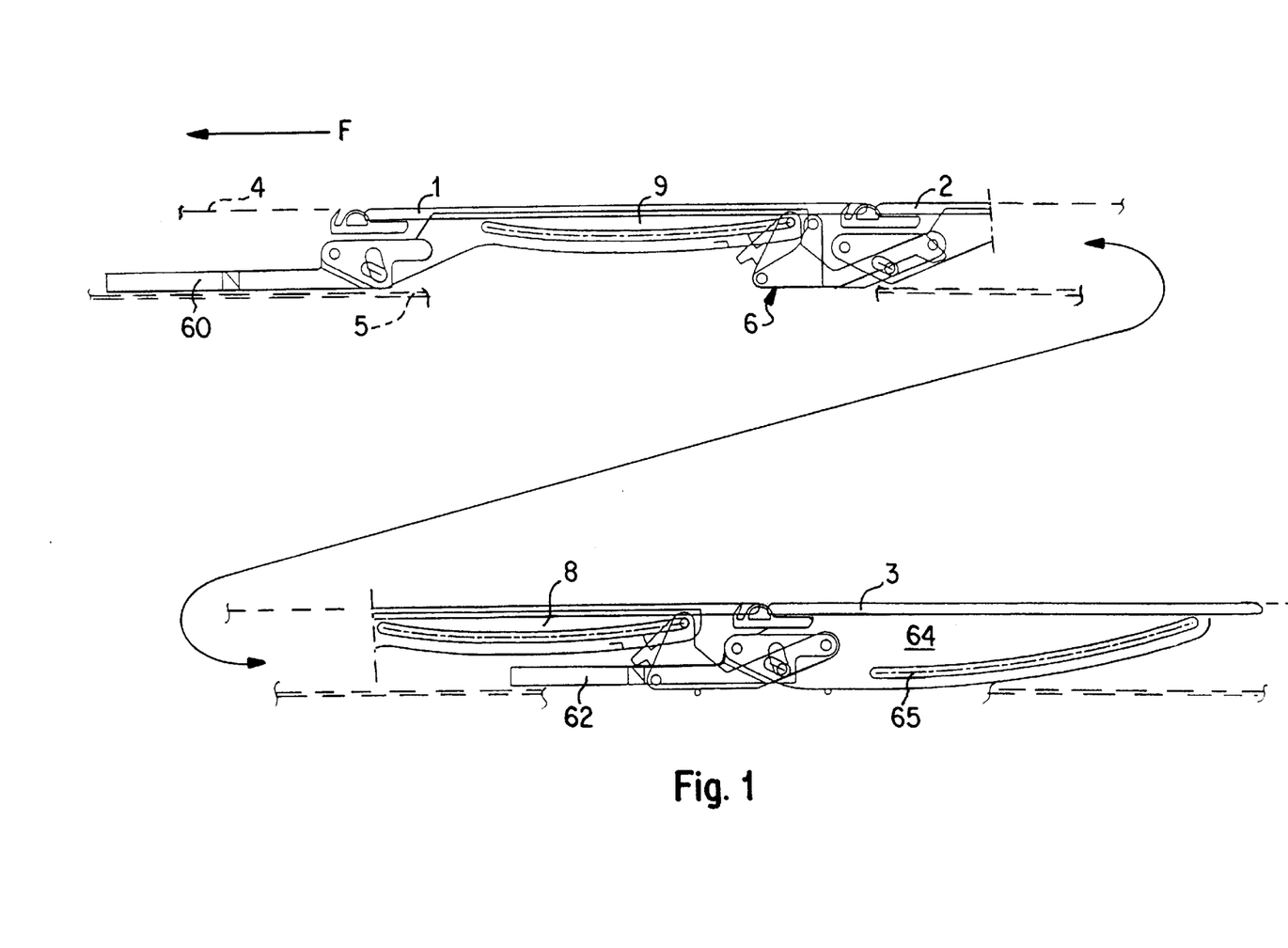
FIG. 1 is a side, schematic illustration of the composite lamella arrangement of a lamella roof via which, with the lamellae closed, a roof opening is covered, the lamellae being guided on both sides of the roof opening via roof-mounted guide rails, which are provided in the region of the lamella ends and are not illustrated any more specifically, as parts of a guide mechanism; the roof contour and the guide rails are only indicated and the composite lamella arrangement, which is constructed symmetrically to the longitudinal center plane, running in the displacement direction of the lamella roof.

FIG. 1 shows a composite lamella arrangement of a lamella roof in its closed position, in which the roof opening (not shown) is covered. The composite lamella arrangement comprises three lamellae, but can, of course, be supplemented at any time to form a composite arrangement with a greater number of lamellae. The individual lamellae are designated by numerals 1 to 3, and, in relation to the closed position illustrated, the foremost lamella, as seen in the closing direction, which in the exemplary embodiment corresponds to the direction of travel F, is designated by numeral 1, the central lamella is designated by numeral 2 and the rear lamella is designated by numeral 3. In the closed position illustrated, the lamellae 1 to 3 are located with their top side approximately flush with the roof contour 4, which is indicated by dashed lines, and they are guided, via corresponding guide mechanisms, in roof-mounted guide rails 5 which are located on both sides of the roof opening, and are arranged at the ends of the lamellae, as indicated schematically in FIG. 1 by a double dashed line.

Of the guide mechanisms, the one located between the lamellae 1 and 2 is designated by numeral 6. Such a guide mechanism 6 comprises, as can be seen, in particular in FIGS. 9 and 10, alongside the guide rail (not shown there), a guide carriage 7 on which two successive lamellae are supported via their lamella carriers 8, 9, only the lamella carriers 8, 9, and not the lamellae, which are borne in each case on the spine 10 of the lamella carriers 8, 9, being shown in this case.

Figure 9:
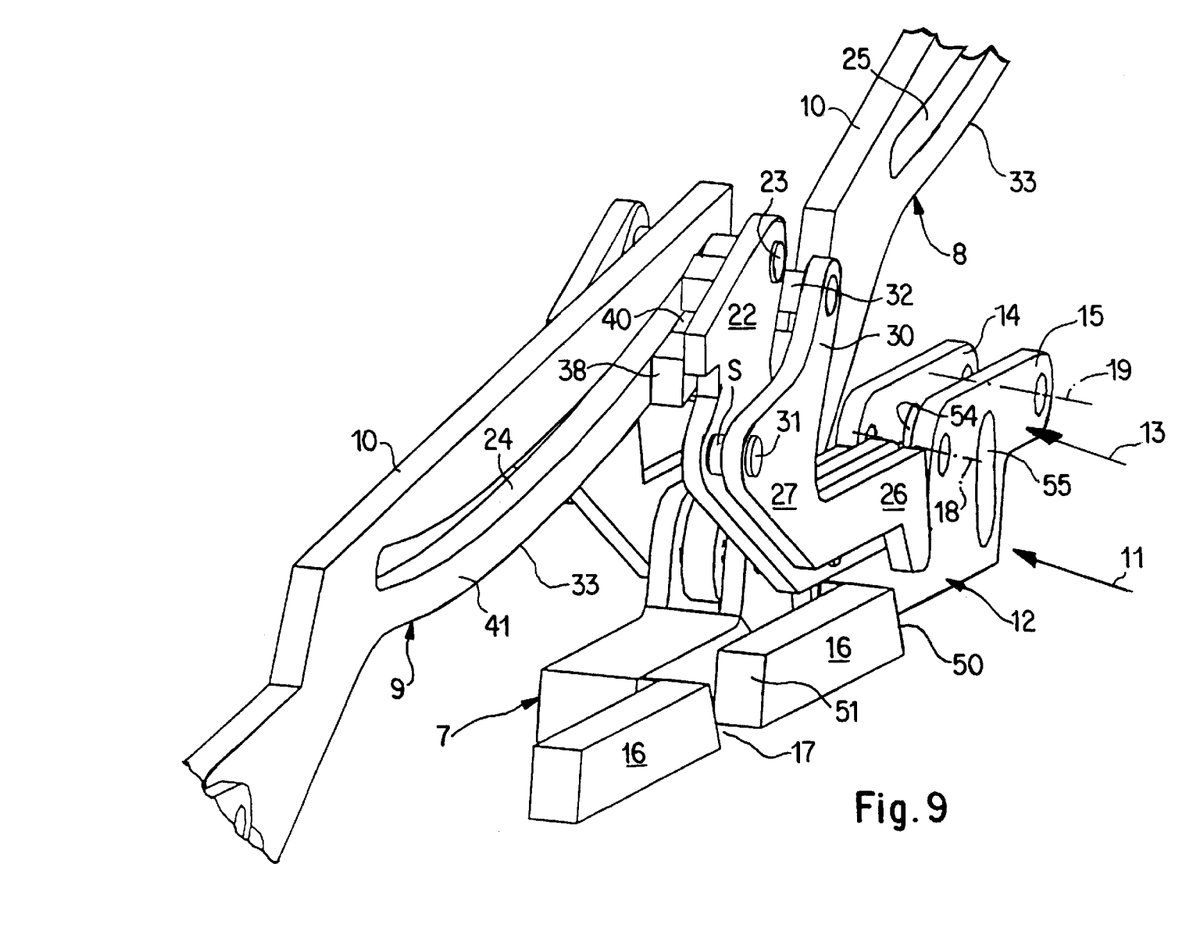
FIG. 9 is a perspective view of part of the guide mechanism, the guide rail which receives the guide carriage of the guide mechanism not being shown and the position being assumed to be that in which two successive lamellae are positioned in a manner corresponding approximately to FIG. 7.

Starting from an assumed closing direction F, the lamella carrier 8 is assigned to a rear lamella, which is set in position first of all during opening of the composite lamella arrangement, and the lamella carrier 9 is assigned to an upstream lamella, as seen in the closing direction F. In a composite lamella arrangement with a plurality of lamellae located between the end lamellae, analogously to the lamella carrier 9, the rear lamella carrier 8 would likewise be supported on a guide carriage. Although FIG. 9 illustrates the guide carriage in this respect, and designates it by numeral 11, the illustration does not show those parts of the guide mechanism which are located between the guide carriage 11 and the lamella carrier 8. Consequently, as far as the guide carriages 7, 11 are concerned, it is only their position relative to one another in which the lamella carrier 8 is opened out to the full extent which is depicted. This makes it easier to see the carriage construction with reference to the guide carriage 11. The carriage 11 has a central body 12 which, in its rear end region, bears a forked bracket 13 with form arms 14 and, 15 and, offset laterally in the opposite direction in relation to the central body 12, is provided with an extension arm 16 which extends in the closing direction and, with the guide carriages moved toward one another, overlaps laterally with the next-following guide carriage 7. With an identical construction of the guide carriages 11 and 7, the latter likewise has an extension arm 16 dimensioned, lengthwise, in relation to one another and to the length of the central body 12 such that, with the carriages 7 and 11 moved against one another, an engagement opening 17 is produced between the extension arms 16. Those end sides of the extension arms 16 which bound the opening are designated by numerals 50, 51 and are beveled, and inclined in opposite directions. Thereby, the engagement opening 17 widens in the direction of the bearing surface of the extension arms 16. The end side 51 forms a run-on slope as a result of the beveling.

As can be seen for the illustrated guide carriage 11, the guide carriages bear in the region of their forked, raised bracket 13, at mutually opposite end regions of the same, as seen in the closing direction F, pivot pins 18, 19. The pivot pin 18 is assigned to the front end region of the bracket 13, as seen in the closing direction F and serves as a carriage-mounted rotary pin for a lamella carrier corresponding to the lamella carrier 8. This comes to rest between the fork arms 14 and, 15, penetrating partially between the fork arms 14, 15 in a position corresponding to the closed position of the lamella. On the pivot pin 19, a control rocker corresponding to a control rocker 22 is mounted with the bracket 13.

Figure 10:
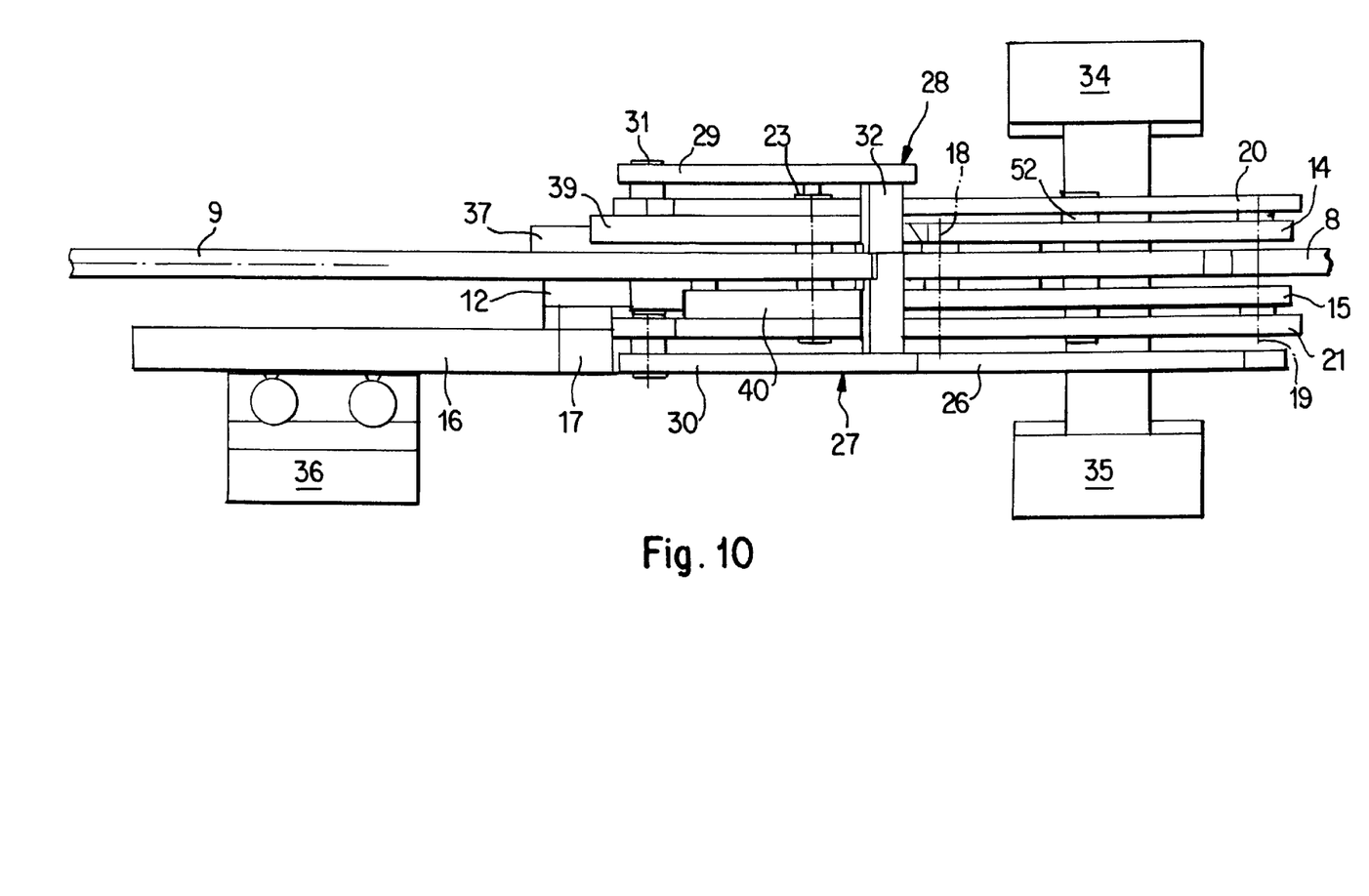
FIG. 10 is a plan view of the guide mechanism without guide rail.

The arms of the control rocker 22 are designated by numerals 20, 21 and are connected via a transverse bridge in the region located upstream of the bracket 13, as seen in the closing direction. As FIG. 10 shows, the arms 20, 21 of the control rocker 22 extend into the front region of the guide carriage, as can be seen for the guide carriage 7, and, in this region, they bear a guide spindle 23 which, as is shown for the lamella carrier 9 in FIG. 9, passes through the lamella carrier in the region of a guide slot 24, which extends, with shallow curvature in the longitudinal direction of the lamella carrier 9. A corresponding guide slot 25 is indicated for the lamella carrier 8. The lamella carriers and the guide mechanisms for the lamellae of a composite lamella arrangement which are located between the end lamellae are of the same configuration.

The control rocker 22 is a carrier for a blocking element 27, which comprises a blocking lever 26. The blocking element 27 comprises, as carrier for the blocking lever 26, a bracket 28 which is U-shaped in plan view, the arms of which are designated by numerals 29, 30 and are mounted on the arms 20, 21 in the foremost end region, as seen in the closing direction F, of the control rocker 22, which is angled in side view. The pivot pin in this respect is designated by numeral 31, and the arms 29, 30 are connected via a crosspiece 32 which, on the respectively associated lamella carrier, in this case on the lamella carrier 9, is assigned a guide which is formed by the narrow side located opposite the spine 10, as guide path 33, and the end side 56 of the lamella carrier 9. The blocking lever 26 of the blocking element 27 is located beyond the crosspiece 32, in extension of the angled arm 30, which bears the crosspiece 32 on one leg and merges into the blocking lever 26 by way of the other leg. The blocking element 27 can be loaded or biased by a spring S in a direction toward its supporting position relative to the lamella carrier 9.

The blocking lever, in its locking position, engages the engagement opening 17 between successive extension arms 16. The blocking lever 26 assigned to the front carriage 7, as seen in the closing direction in each case, engages in each case behind the extension arm 16 of the next-following, rear guide carriage 16, as seen in the closing direction, with the result that the guide carriages are coupled to one another. Corresponding securing of the guide carriages could also be achieved with the context of the invention, although not illustrated, in that the blocking lever engages in each case in a corresponding opening of the guide rail or engages behind a corresponding attachment.

FIG. 10 also shows guide bodies 34 to 36 which are assigned to the respective guide carriage, in this case the guide carriage 7, which may be formed by sliding blocks or the like. The guide bodies 34, 35 are arranged opposite one another in the rear end region, as seen in the closing direction, that is to say approximately in the region of the bracket 13, while the guide body 36 is arranged in the region of the extension arm 16.

During opening and closing of lamella roofs, the individual lamellae may indeed be driven independently of one another, but this requires considerable outlay. As a result, the drive usually takes place starting from one end, if appropriate also from both ends, of the lamella roof. Assuming, based on the present lamella-roof structure, that, in order to close the lamella roof, it is necessary to subject the foremost lamella, as seen in the closing direction, or the guide mechanism thereof, to a tensile force which is transmitted via the respective lamellae and the lamella carriers assigned thereto, by way of the corresponding guide mechanisms, then it is essential for the actuating forces to be kept as low as possible. This applies, in particular, also to the operation of opening the lamella roof, in which corresponding compressive forces are introduced via the foremost lamella, as seen in the closing direction, or the guide mechanism thereof. The compressive forces cause displacement of the composite lamella arrangement with opening out of the lamellae starting from the rear lamella, as seen in the closing direction.

The transmission of the compressive forces requires corresponding supports formed according to the invention, as can be seen from FIGS. 9 and 10 in particular, via supporting bodies 37 to 40. The supporting bodies 37, 38 are assigned to opposite sides of the lamella carrier 9 and, in corresponding pivot positions of the control rocker 22, overlap with supporting bodies 39, 40, which are assigned to the arms 20, 21 of the control rocker 22, in the region thereof which overlaps with the lamella carrier 9, and which are located between the arms 20, 21 and the lamella carrier 9.

The supporting bodies 37, are preferably provided in the crosspiece region 41 of the lamella carrier 9. The region 41 is located between the guide path 33 and the guide slot 24, and, in a further configuration, the stop surfaces between the supporting bodies 37, 39 and the supporting bodies 38, 40, are preferably also located at different radial distances from the guide spindle 23 which passes through the guide slot 24 and is retained in the arms 20, 21 of the control rocker 22. This means that it is possible with only narrow bearing surfaces, which are all that is possible for space reasons in the pivoting direction, to realize a sufficient degree of overlap.

Figure 8:
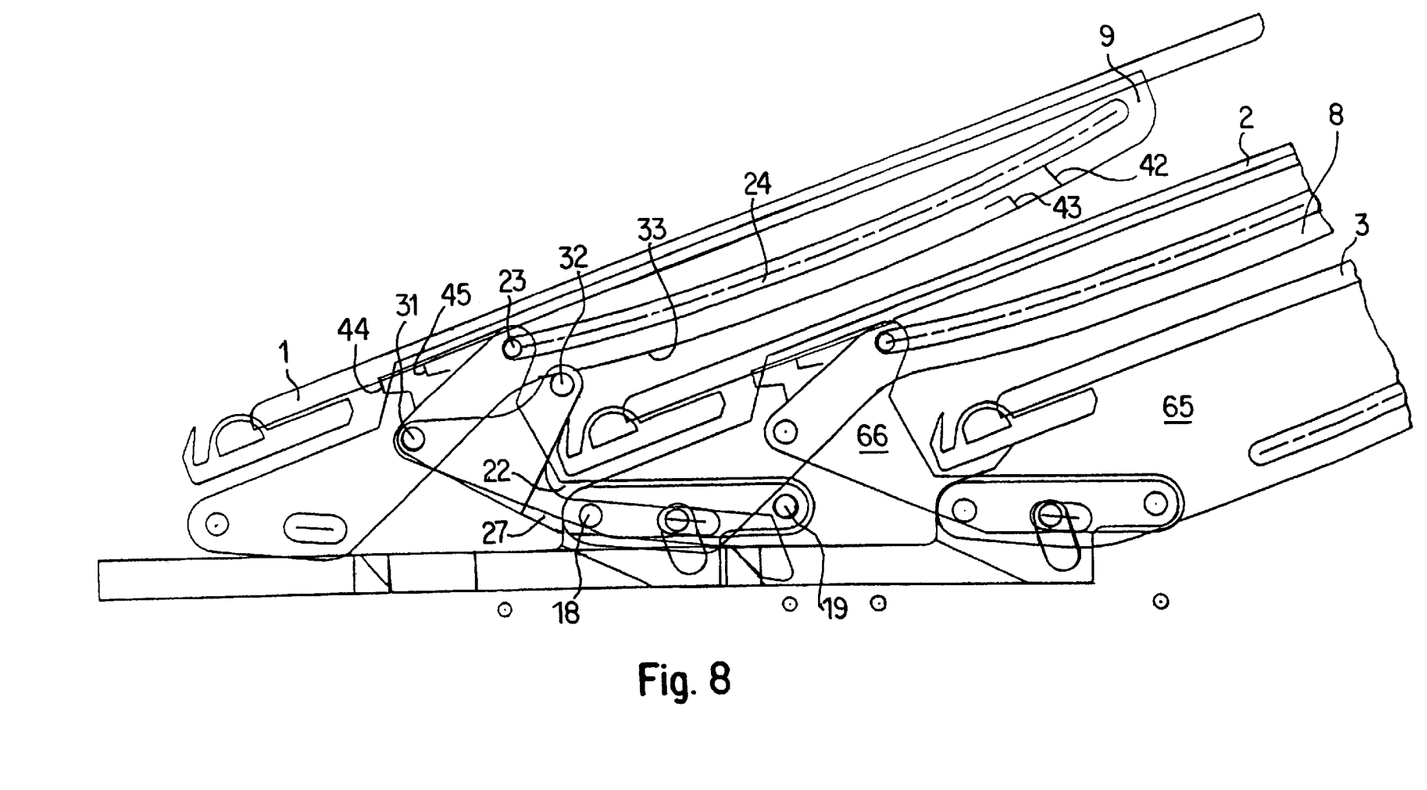
FIG. 8 is a view corresponding to FIG. 1 of the lamella roof in a fully opened position, the latching between the guide carriage assigned to the rear lamella and the guide carriage assigned to the central lamella being shown, bu the illustration of the actuating drive acting on the foremost guide carriage, as seen in the closing direction, being omitted.

The mutual abutment surfaces of the supporting bodies are illustrated in FIG. 8 for the front lamellae, as seen in the closing direction, of the composite lamella arrangement and for the supporting bodies 37, 38, which are provided on the lamella carrier, are designated by numerals 42, 43. The supporting bodies 39, 40, which are assigned to the control rocker 22, have abutment surfaces 44, 45, respectively. The supporting bodies 37, 38 are preferably also staggered in relation to the lamella carrier 9 in the pivoting direction of the control rocker 22. As a result, with the stop pairings which are located on both sides of the lamella carrier 9, and are formed by the supporting bodies 37 to 40 and their stop surfaces 42 to 45, engagement regions which are different but overlap in the blocking position are achievable.

In FIG. 9, the supporting bodies 38, 40, which are directed toward the visible side, can only partially be seen.

The coupling of the lamella carrier 8 to the arms 20, 21 of the control rocker 22 preferably takes place via a carrying spindle 52 which is fixed in the arms 20, 21 of the control rocker 22 via corresponding receiving bores and passes through the lamella carrier 8 in a slot guide 53 (e.g. in FIG. 8). Consequently, pivoting movements of the lamella carrier 8 are converted into pivoting movements of the control rocker 22. The slot guide 53 allows the longitudinal offset of the carrying spindle 52 in relation to the lamella carrier 8, and the longitudinal offset is caused by the offset of the pivot pins 18, 19.

By the selection of the spacing of the carrying spindle 52 in relation to the pivot pins 18, 19, and by the inclination of the slot 53, which extends essentially in the direction of a straight line connecting the pivot pins 18, 19, the transmission ratio can be determined in relation to the mutual pivoting movements. Appropriate slot-like cutouts 54, 55 are provided in the fork arms 14, 15 to overlap with the slot guide 53 and ensure the necessary freedom of movement in relation to the bracket 13.

FIGS. 1 to 8 depict the functioning of the guide mechanism in conjunction with a lamella roof with a composite lamella arrangement comprising three lamellae 1 to 3, of which the lamella 1 is the foremost lamella, as seen in the closing direction F, which in the illustrated embodiment corresponds to the direction of travel. In FIG. 1, the lamellae 1 to 3 and the guide mechanism assigned to them are shown in the position corresponding to the closed position of the roof, with the top side of the lamellae 1 to 3 coinciding approximately with the roof contour 4.

The roof opening, which can be covered via the lamella roof, has lateral guide rails which are indicated by numeral 5 with a double dashed line and in which the guide carriages 60, 61, 62 run. These guide carriages correspond to the guide carriages 7, 11 explained with reference to FIGS. 9 and 10 and are assigned to the lamellae 1 to 3. Irrespective of the fact that a full guide mechanism 6, as has been explained with reference to FIGS. 9 and 10, is only used in the connecting and supporting region between the lamellae 1, 2, the guide carriages 60 to 62 are preferably identical parts, the central guide carriage not being illustrated in FIG. 1.

Control rockers 22 according to FIGS. 9 and 10 are used in the articulation of the lamella 1 in relation to the guide carriage 61 and in the articulation of the lamella 2 in relation to the guide carriage 62. Latching of successive guide carriages 61, 62 via the blocking lever 26 of the blocking element 27 is carried out merely between the guide carriages 61, 62 because the guide carriage 60 is adjoined by the drive, which is not shown any more specifically, and acts as a pushing-action drive during opening and as a pulling-action drive during closing of the roof. The tensile and compressive forces are transmitted insofar as the guide carriages 61 to 63 are not coupled directly, which presupposes fully opened-out lamellae in each case, by way of the lamella-bearing lamella carriers.

If the opening operation is begun by a compressive force P being introduced to the foremost guide carriage 60, as seen in relation to the closed roof, this gives first of all a composite arrangement with high compressive strength, and the rear guide carriage 62, as seen in the closing direction F of the lamella roof, is displaced in the direction of a rear stop position, with the rear lamella 3 being opened out simultaneously. A lamella carrier 64 assigned to the lamella is pivoted out via its guide slot 65 by interaction with an opening-out device (not illustrated any more specifically here), which may be formed, for example, by a bearing block which is fixed in relation to the guide rail. Until this rear, opened-out end position of the lamella 3 and the associated guide carriage 62 has been reached, a control rocker 66 is pivoted about its pin 67. The lamella 2, which is borne via the control rocker 66, being pivoted out and the lamella carrier 8, assigned to the lamella 2, is supported with high compressive strength against the control rocker 66. The functioning in this respect proceeds in accordance with the explanation given with reference to FIGS. 9 and 10. If the lamella 3 has reached the end position, as is shown in FIG. 2, then the support, with high compressive strength, of the lamella carrier 8 in relation to the control rocker 66 is terminated by disengagement of the corresponding supports via the abutment surfaces, which analogously to FIG. 8 are designated by numerals 42, 45.

For the guide mechanism assigned to the guide carriage 61, corresponding to that seen in FIGS. 9 and 10, there is also an intermediate position, in which, although the lamella 1 is opened out to a slight extent, support with high compressive strength is still provided. This situation is illustrated on an enlarged scale in FIG. 3, the same designations being used for the mechanism in FIG. 3 as in FIGS. 9 and 10 since the relative mechanisms correspond to one another.

Figure 2:
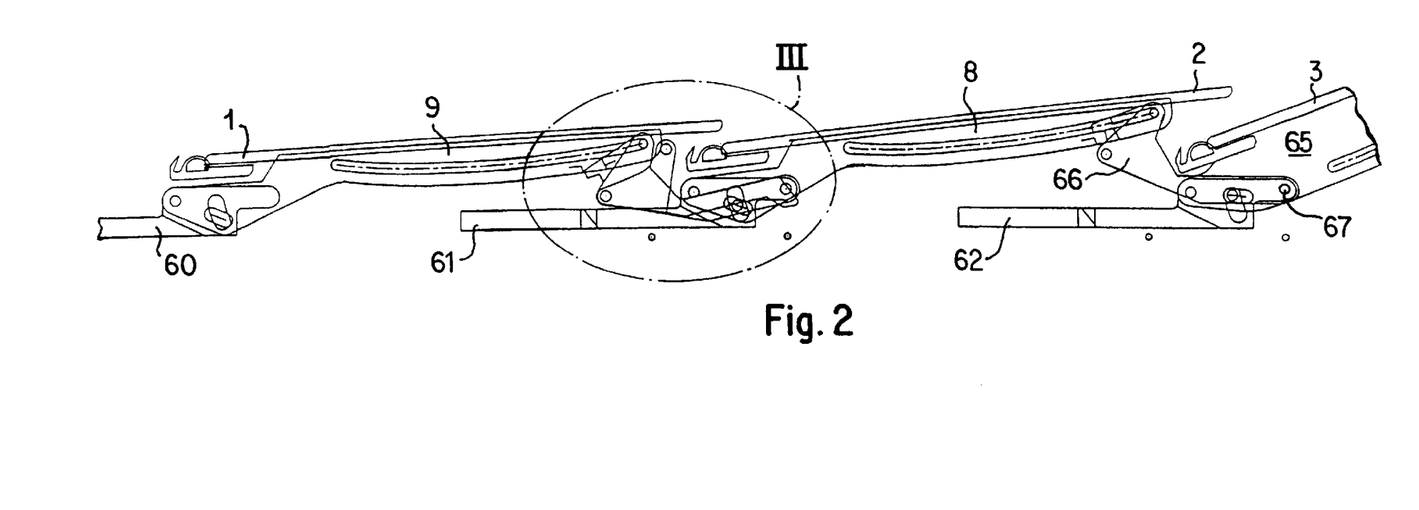
FIG. 2 is a view corresponding to FIG. 1, with the lamella roof opened to a slight extent, in which the rear lamella, as seen in the direction of travel and closing direction, has reached its stop-secured end position, in which it is opened out obliquely upward in the rearward direction, pushed by the assembly, with high compressive strength, of the upstream lamellae, and the next-following lamellae are opened out, and open, to a slight extent in the corresponding direction.
Figure 3:
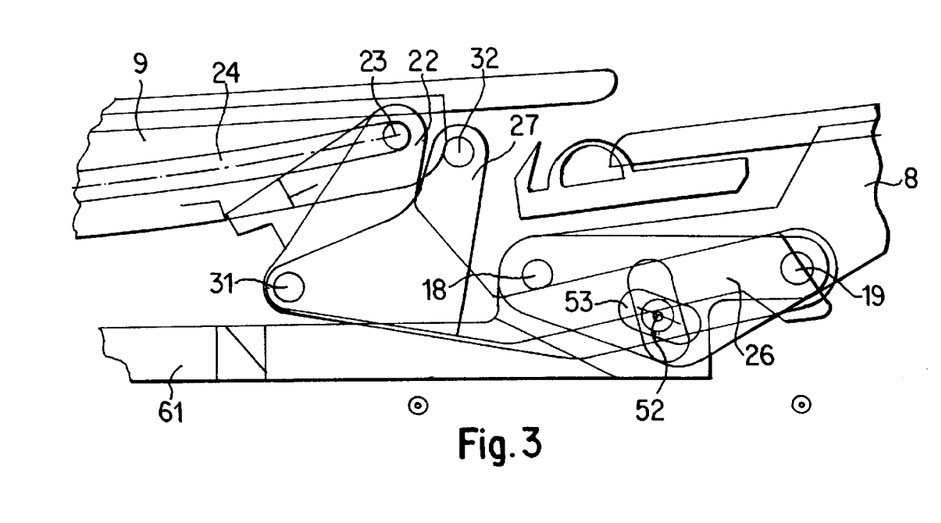
FIG. 3 is an enlarged detail view of the oval region III shown in dash lines in FIG. 2.
Figure 4:
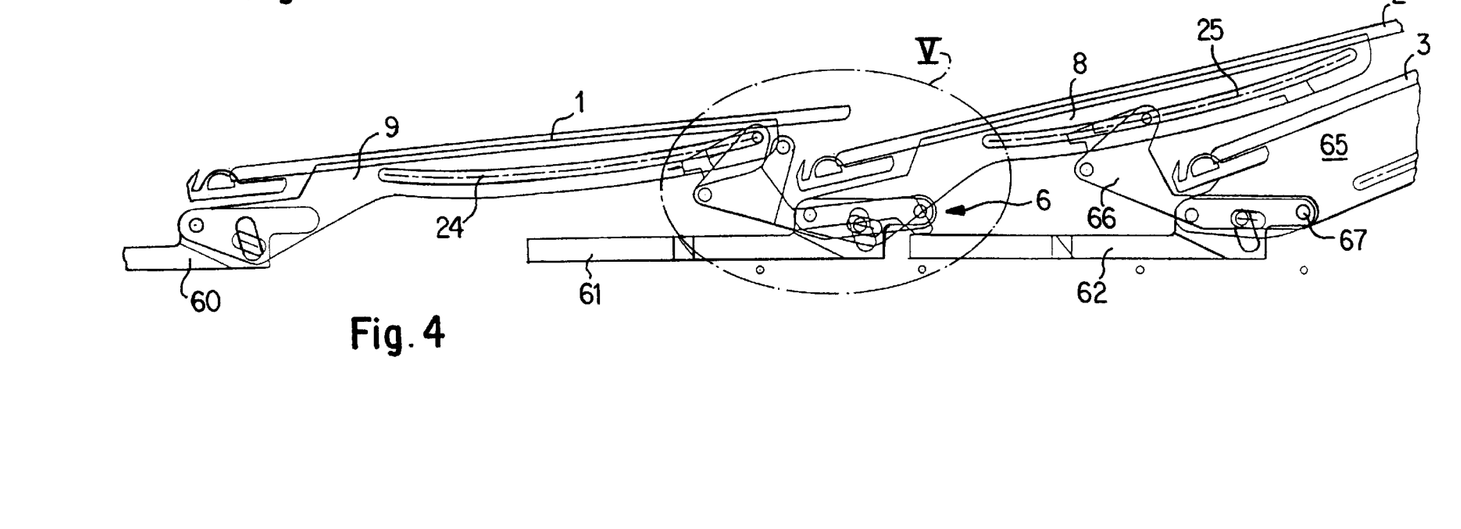
FIG. 4 is a view corresponding to FIG. 1, but in the displacement phase of the next-following lamella.

FIG. 4 shows a further intermediate position in the opening operation of the roof, although for the lamella 3 and the guide assigned thereto there are no differences in relation to the state shown in FIG. 2, since FIG. 2 already illustrates the end position.

For the lamella 2, FIG. 4 shows a central displacement position which, starting from the termination of the support, with high compressive strength, of the lamella carrier 8 in relation to the control rocker 66 in FIG. 2, is achieved as the opening operation continues when the preceding guide carriage 61 has virtually reached the guide carriage 62 and the extension arm 16 of the guide carriage 62, which in this respect corresponds to the guide carriage 11 in FIG. 9, runs into a position in which it overlaps with the guide carriage 61, which corresponds to the guide carriage 7 in FIG. 9. The pivot lever then overlaps with the extension arm 16 and, by way of its crosspiece 32, overlaps with the lamella carrier 9 of the lamella 1. The carrier is still supported with high compressive strength via the corresponding stops in relation to the control rocker 22. This is shown on an enlarged scale in FIG. 5, the designations used in FIGS. 9 and 10 also being used here.

Figure 6:
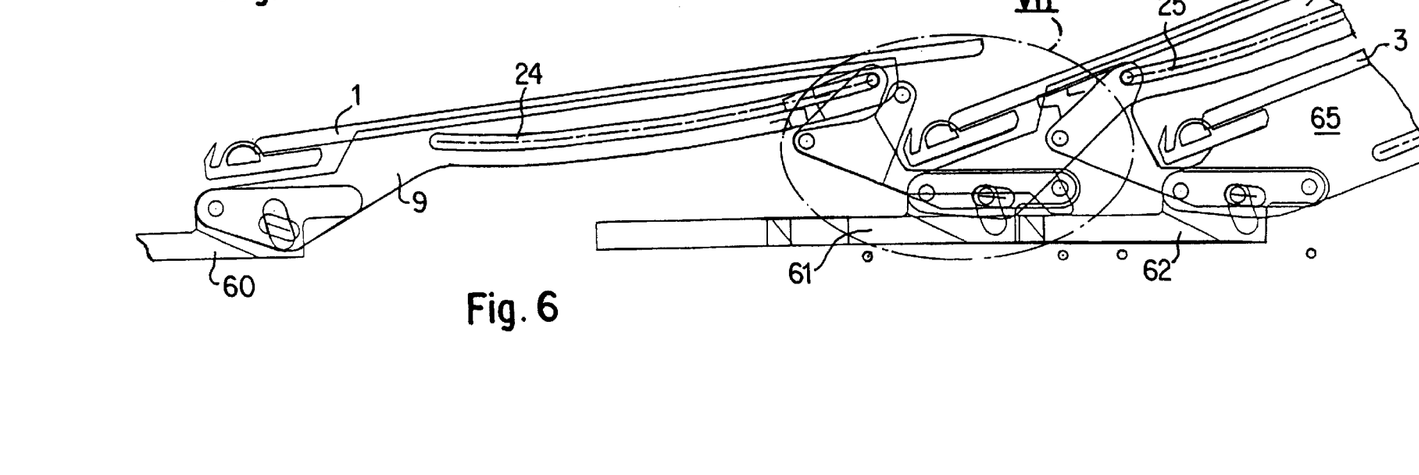
FIG. 6 is a further view corresponding to FIG. 1, in which the lamella roof has been opened to a further extent in relation to the position shown in FIG. 4 and the lamella following the rear lamella has reached its fully opened position and the displacement of the next-following lamella begins.

FIG. 6 also shows the fully pivoted-out state for the lamella 2. This state is reached by further displacement of the guide carriages 60, 61, with the guide carriages 61, 62 now overlapping.

Figure 5:
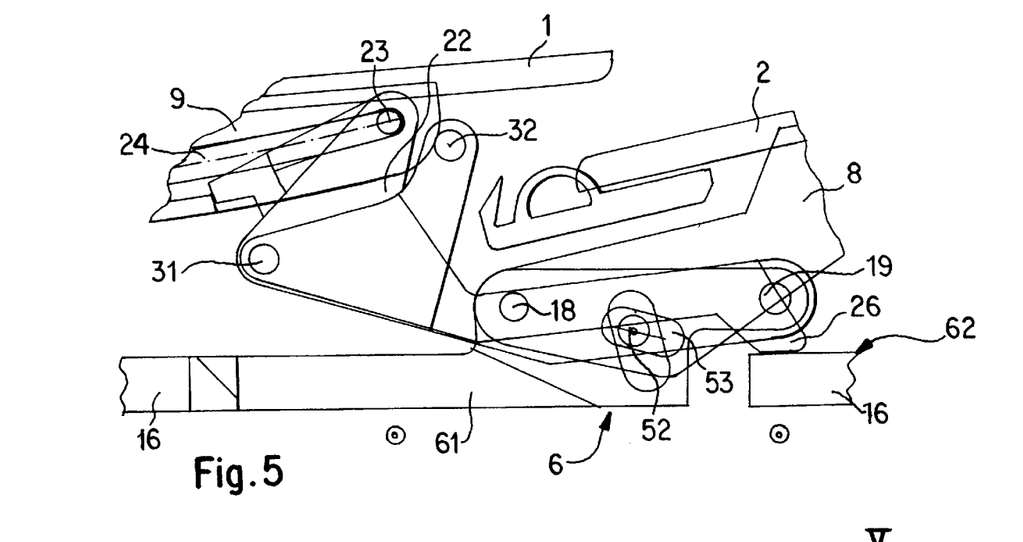
FIG. 5 is an enlarged detail view of the region V shown in dash lines in FIG. 4.
Figure 7:
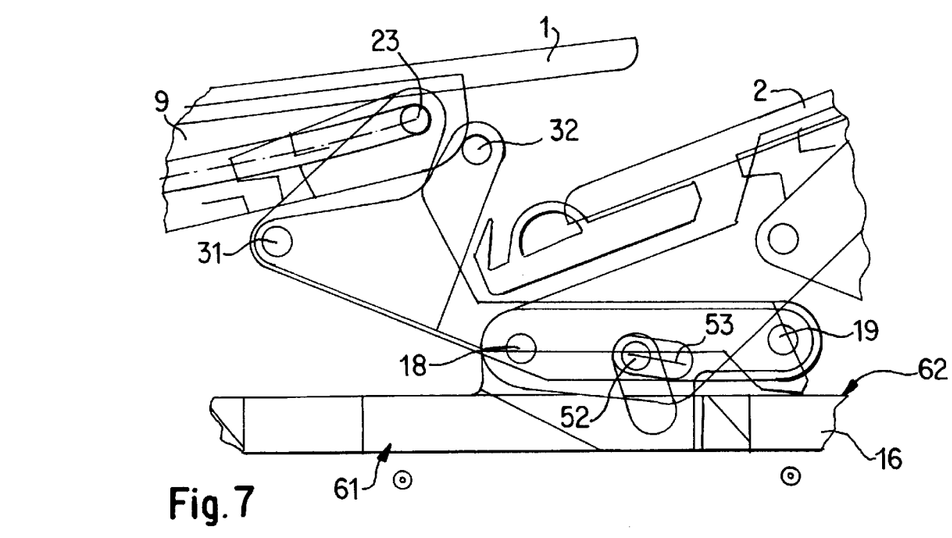
FIG. 7 is a detail view of the region VII shown in dash lines in FIG. 6.

In the transition from the position shown in FIGS. 4 and 5 into the position shown in FIGS. 6 and 7, along with the lamella 2 pivoting out further, the support with high compressive strength between the rocker 22 and the lamella carrier 9 is finally terminated. For this purpose the abutment surfaces 44, 45, assigned to the rocker 22, pass out of the position in which they overlap with the abutment surfaces 42, 43 of the lamella carrier 8. At the same time, the crosspiece 32 of the blocking element 27 runs out of the position in which it overlaps with the end side 56 of the lamella carrier 9 into an abutment position in relation to the guide path 33 of the lamella carrier 8. This transition is only possible when the blocking lever 26, which is initially still supported on the extension arm 16 of the guide carriage 62, drops into the engagement opening 17, as is shown in FIG. 9, that is to say a position which corresponds at least virtually to the end position of the guide carriages 61, 62 with the roof opened out has been reached in the displacement direction.

In functional terms, there is thus first of all support, with high compressive strength, of the lamella carrier 9 against the guide rocker 22, the support being combined, at least in the transition region in which the lamella 2 has reached its extended end position and it is thus necessary to release the displacement of the lamella 1 in relation to the lamella 2 in order to continue the opening operation, with support between the lamella carrier 9 and the crosspiece 32 of the blocking element 27, with the result that, upon disengagement of the associated abutment surfaces 42 to 45, the supporting forces between the lamella carrier 9 and control rocker 22 are at least partially absorbed via the blocking element 27 and the crosspiece 32 thereof, in order to prevent the abutment surfaces 42 to 45 from being subjected to high loading, in particular in their edge regions, and thus to prevent premature wear. Within the context of the invention, this is to be regarded as an additional measure which is expedient, if appropriate, as a supplement to the pressure-exerting support between the lamella carrier and control rocker.

Once the displacement of the lamella 1 has been released, then a compressive force which continues to be exerted on the carrying carriage 16 results in the lamella 1 running into the position according to FIG. 8. In this position, the roof is open to the full extent and the guide carriages 61, 62 are locked in relation to one another, while the guide carriage 60 is positioned correspondingly via the drive.

The closing operation of the roof proceeds correspondingly, in which, starting from the position shown in FIG. 8, first of all the guide carriage 60 passes into the position shown in FIG. 6. Thereby, on account of the beveling of the end side 50, the blocking element 27 is forced out of its blocking position. As an alternative to this, but preferably only as an auxiliary measure, appropriate spring activation of the blocking element, with the effect of pivoting the crosspiece 32 in the direction of the guide path 33, can activate the blocking element 27 correspondingly, although this is not illustrated here.

With the locking between the guide carriages 61, 62 relinquished once the lamella 1 has been moved back in the closing direction to the full extent, the guide carriage 61 is carried along via the lamella 1 and the lamella 2 is displaced in the direction of its closing position. The guide carriage 62 still is retained in its end position in a manner which is not illustrated here. This latter end position is only relinquished when the lamella 2 has reached the end position shown in FIG. 3. Thereafter, the locking of the guide carriage 62 is released, and the carriage can be locked, for example, via a blocking element which is analogous to the blocking element 27, and interact with a guide-rail-side end stop. With the lamella 3 being moved back and pivoted into the closed position, the positive coupling via the control rockers results in the upstream lamellae 1, 2 also being pivoted gradually into their respective closed position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A lamella roof for a roof opening of a motor vehicle, comprising guide mechanisms; at least two lamellae, a forward one of the lamellae being movably guided on rails operatively associated with the roof opening, via an associated one of the guide mechanisms, in a closing direction to a closed roof position, in which the at least two lamellae are arrangeable in a composite sheet-like arrangement covering the roof opening, and in an opening direction to an open roof position, in which the roof opening is exposed and the at least two lamellae are opened out obliquely such that adjacent ones of the lamellae are arrangeable to partially overlap one another in a layered manner; guide carriages with each of the guide mechanisms configured to support a forward lamella carrier on two successive ones of the guide carriages, of which at least one of the guide carriages, in relation to the closing direction, has a first pivot pin for a rearward lamella carrier operatively associated with a rearward one of the at least two lamellae and a second pivot pin spaced from the first pivot pin for a control rocker arranged to be changed over from a basic position associated with the closed roof position, into a functional position thereof to control a roof-opening-out operation of the at least two lamellae, and each of the guide carriages is operatively connected to the associated forward lamella carrier, via a guide slot running along said forward lamella carrier, wherein, at least in the opening direction the control rocker is positively pivotingly movement-coupled to an adjacent one of the lamella carriers located rearwardly of the associated control rocker as viewed in the closing direction.

2. The lamella roof as claimed in claim 1, wherein, in the opening and closing directions, the control rocker is positively pivotingly-movement-coupled to the rear lamella carrier, as seen in the closing direction.

3. The lamella roof as claimed in claim 1, wherein the positive coupling between the control rocker and lamella carrier is provided over an entire pivoting range thereof.

4. The lamella roof as claimed in claim 1, wherein the respective pivot pin of the lamella carrier and control rocker are mutually offset such that the positive coupling between the control rocker and lamella carrier occurs in a mutual-overlapping region.

5. The lamella roof as claimed in claim 1, wherein the pivot pin for the lamella carrier, which is associated with the rear lamella, is offset, in relation to the pivot pin of the control rocker, in the direction of the lamella carrier which is assigned to the front lamella.

6. The lamella roof as claimed in claim 4, wherein the control rocker, in a region between the pivot pins, is operatively supported in a vertical direction in relation to the lamella carrier, associated with the rear lamella.

7. The lamella roof as claimed in claim 1, wherein a carrying spindle runs in one of the control rocker and in the lamella carrier in a slot guide for coupling the control rocker and the lamella carrier.

8. The lamella roof as claimed in claim 7, wherein the slot guide extends substantially parallel to a straight line connecting the pivot pins.

9. The lamella roof, as claimed in claim 1, wherein in a region of basic position at the closed position, the control rocker connected to the lamella carrier, which is located upstream of the guide carriage as seen in the closing direction, via the guide slot, running in the longitudinal direction of said lamella carrier, is supported with compressive strength in the displacement direction against at least one support assigned to the lamella carrier.

10. The lamella roof as claimed in claim 9, wherein the at least one support comprises supporting bodies located on both sides of a crosspiece of the lamella carrier.

11. The lamella roof as claimed in claim 10, wherein the supporting bodies are relatively offset in the longitudinal direction of the lamella carrier.

12. The lamella roof as claimed in claim 9, wherein the at least one support between the control rocker and lamella carrier is associated with a support via a blocking element which is controlled in relation to a position of the rear lamella carrier, as viewed in the closing direction.

13. The lamella roof as claimed in claim 12, wherein the blocking element is spring-loaded in the direction of a supporting position thereof in relation to the lamella carrier.

14. The lamella roof as claimed in claim 12, wherein the blocking element comprises a blocking lever operatively mounted on the control rocker and is movable over a guide path upon displacement of the associated lamella carrier which is openable out in the opening direction, via the control rocker, over a guide path such that the blocking lever is secured, via the guide carriage associated with the control rocker, in a position which corresponds to the open position of the associated lamella relative to the next-following guide carriage, as viewed in the closing direction.

* * * * *